United States Patent [19]
Willey

[11] Patent Number: 5,251,953
[45] Date of Patent: Oct. 12, 1993

[54] VEHICLE WINDOW AIR DEFLECTOR
[75] Inventor: Barry A. Willey, Maywood, Ill.
[73] Assignee: National Cycle, Inc., Maywood, Ill.
[21] Appl. No.: 821,381
[22] Filed: Jan. 13, 1992
[51] Int. Cl.$^5$ .............................................. B60J 1/20
[52] U.S. Cl. .................................... 296/152; 296/154; 454/131; 454/135
[58] Field of Search ................ 296/152, 154; 454/128, 454/131, 135

[56]           References Cited
         U.S. PATENT DOCUMENTS

| 3,294,439 | 12/1966 | Phillips, Jr. ........................ | 296/152 |
| 4,558,633 | 12/1985 | Lingg ................................. | 296/152 |
| 4,685,718 | 8/1987 | Steenblik et al. .................. | 296/154 |

FOREIGN PATENT DOCUMENTS

| 157641 | 8/1953 | Australia ............................. | 296/154 |
| 2943068 | 5/1981 | Fed. Rep. of Germany ...... | 296/152 |
| 0265723 | 11/1988 | Japan ................................. | 296/152 |
| 0247214 | 10/1989 | Japan ................................. | 296/152 |
| 0668750 | 1/1989 | Switzerland ........................ | 296/152 |
| 871556 | 6/1961 | United Kingdom ................ | 296/154 |

Primary Examiner—Dennis H. Pedder
Attorney, Agent, or Firm—James T. FitzGibbon

[57]           ABSTRACT

An air flow control device for attachment to a window frame of a vehicle door. The device includes a flow deflector element mounting clips and fasteners securing the clips to the deflector element. The deflector element has an upper margin adapted to contact the outer surface of the window frame and the clip element lies between a part of the window frame and a dual channel insert, one channel of which receives a window frame-forming seam and the other of which receives the window glass. The clips lie between the insert and the window frame and bias the upper margin of the deflector into or toward contact with the window frame such that the clip itself does not contact the outer window frame surface.

11 Claims, 3 Drawing Sheets

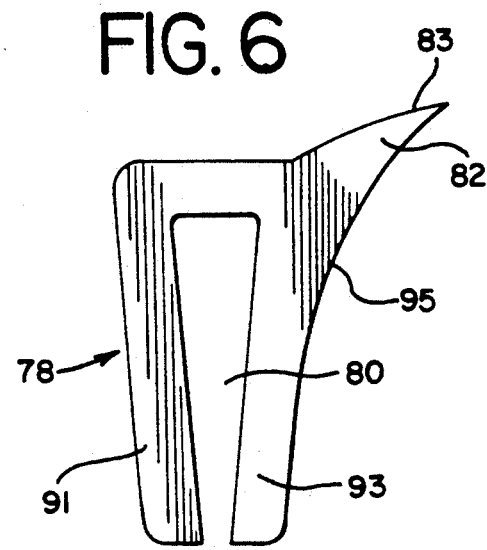
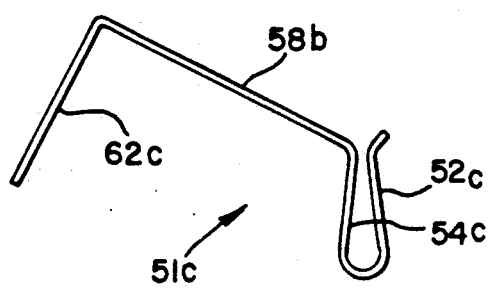

VEHICLE WINDOW AIR DEFLECTOR

The present invention relates generally to automotive accessories, and more particularly, to air flow control devices. In its most common application, the invention provides a combination wind/rain deflector for attachment to the window frame of a vehicle such as an automobile or light truck.

By way of background, the diverse requirements of today's vehicles are being met to a greater or less degree by various design efforts. There is a significant requirement for economy of operation, as well as low initial vehicle cost. One of the most common operating conditions a vehicle encounters is that of cruising roads and highways at speeds wherein air resistance is significant, i.e., speeds of 35–45 miles per hour or more. As is well known, increased speeds require greater final consumption, with the consumption increasing exponentially relative to speed. For reasons of economy, therefore, in recent years, a great deal of attention has been paid to the aerodynamic characteristics of vehicles. This has primarily been reflected in vehicle body design, wherein a trend to smoother and more rounded shapes is evident.

In addition to the body shape aspects of aerodynamic design or minimizing the effects of less conspicuous aerodynamic modifications have also been made. These include add-on type aerodynamic devices such as so-called wings or spoilers on or the near the rear deck, and so-called "chin" air deflectors beneath the front bumper or grille.

A further aerodynamic trend has been that of eliminating or minimizing the effects of surface irregularities in vehicles. Efforts have been made to eliminate large, squared-off externally mounted mirrors and to replace them with smoother, faired-in components. Finally, efforts have been made to eliminate minor sources of aerodynamic drag, including spaces between body panels, particularly trim and irregular surface contours. In this connection, for example, drip rails have been eliminated or rendered less prominent, door and deck lid handles have been countersunk, upstanding hood ornaments and exposed windshield wipers have been replaced by more aerodynamic elements. In some cases, external ornamentation has been eliminated altogether.

Another area receiving aerodynamic attention has been the area of doors and windows, wherein seam profiles have been flattened and turbulence-inducing aerodynamic gaps have been reduced. In addition, significant efforts have been expended in making window glass more closely approach a flush fit with exterior body panels, so as to minimize the air flow effects of windows which are substantially sunken in or offset from the remainder of the outer body contours.

The creation of new door and window designs has advantageous, particularly when combined with other areas of aerodynamic improvement, in the areas of reduced wind noise with the windows closed, for example. However, in achieving such wind noise reduction by some of the above techniques, certain "tradeoffs" have been made. These involve closed-versus-open-window operation. In many cases, while cars operated with the windows closed are very quiet, the same cars are extremely noisy with the windows open. Consequently, only with closed-window operation can the full benefits of certain aerodynamic improvements be realized.

However, requiring closed window operation presents several problems. One of these is air circulation to the vehicle interior. In order to achieve adequate internal ventilation with the windows closed, some extra energy is required in the operation of fan systems and, in many cases, the operation of air conditioner and defroster/demister systems. Thus, where there is a measurable difference in the inside and outside temperatures, and where window and windshield surfaces are significantly cooler than the atmosphere with which they are in contact, then in the presence of the high relative humidity, surface condensation is inevitable. Removing this condensation requires raising the temperature of the window panes, or at least achieving increased air circulation in the areas adjacent the window surfaces. In many vehicles, the air conditioning compressor is necessarily operated when window defrosters/demisters are energized. This is inefficient from an energy standpoint.

Referring to another aspect of the problem, where the open window operation is attempted, particularly in vehicles without drip rails, rain can leak into the interior. In many vehicles, air flow causes rain to enter the vehicle when the windows are ajar or slightly open. Attempting open-window operation, even for the purpose of humidity and condensation control or elimination of vehicle odors or the like, is therefore often impractical or undesirable. The foregoing situation is thus one wherein, in many of today's vehicles, the option of open window or partially open window vehicle operation has been effectively eliminated. Of course, many vehicle operators or passengers simply prefer the open-air feeling they cannot get with the windows closed, and it would be desirable to permit this option if possible, at low cost.

Wind and/or rain deflectors are known in the prior art, but many or all suffer from one or more disadvantages. In particular, some known flow control or deflector drives are not adaptable to newer style vehicles. Others are not able to provide a high level of performance in use, or are clumsy, ill-fitting or unattractive. Under the present circumstances, it would be desirable to have provided an economical, readily attachable air flow control device for removable attachment to a window frame, particularly one which could minimize turbulence and provide an effective rain shield for use in vehicles with slightly opened windows.

In view of the shortcomings of prior deflectors, and particularly in view of the need for deflectors for use with those vehicles having door and window frames of simplified construction, it is an object of the invention to provide an improved air flow control device for vehicle windows.

Another object of the invention is to provide a device which will permit opening the vehicle windows at least somewhat, without allowing rain, snow or the like to enter the vehicle from the exterior.

A further object is to provide an air and rain deflector for attachment to a vehicle door and which will permit open window operation without measurable sacrifice of aerodynamic efficiency.

A still further object of the invention is to provide a readily attachable window deflector which will minimize or reduce noise in operation and which includes means for creating a snug, air- and liquid-tight exterior seal along its margin of contact with the window frame portion of the outer door surfaces.

Yet another object of the invention is to provide a wind and rain deflector which has an attractive appearance and can be made at low cost.

Another object of the invention is to provide a deflector unit for a window frame which deflector includes a clip attachment system for windows wherein the clip serves as a locating and biasing function for a deflector margin which has a sealing gasket along one of its edges so as to provide a snug, liquid and air-tight attachment to the window frame.

Yet another object of the invention is to provide a wind deflector for a vehicle which may be attached without damage to the vehicle finish in the vicinity of vehicle window frame, and which does not require adhesives or auxiliary means of attachment but which can be snugly secured by a simple push-in or snap-in operation.

A still further object of the invention is to provide a wind control device for attachment to a window vehicle frame in which the deflector element includes a contact margin to which a sealing gasket is attached, a free margin spaced inwardly and downwardly from the engagement margin and defining a portion of the window opening which is offset from the planes of the window panel and the window frame, and a contoured center body portion extending between the two margins, with the device further including a plurality of resilient positioning and biasing clips spaced apart from each other and extending from the margin or center body portion of the deflector, with the clip having inner sections adapted for sung but resilient engagement with the inner seam portion of the window frame.

Another object of the invention is to provide a non-adhesive, non-destructive method of installing an air flow control device which simply requires temporarily removing and reinstalling the duo-channel insert used to provide seam covering and weather stripping functions in a vehicle window.

Yet another object is to provide a deflector wherein a variety of similar but different fastening clips can be used to attach the same or similar deflector to a variety of vehicles.

The foregoing and other objects are achieved by providing a flow deflector having a number of novel advantages and characteristics, including those referred to specifically herein and others which are inherent in the invention. Other objects are also achieved by utilizing this simplified, non-adhesive, non-destructive method of installing the flow control device of the invention. The exact manner in which the above objects are achieved and the advantages of the invention realized will become more clearly apparent when reference is made to the following detailed description of the preferred forms of the invention described in the illustrative examples below and shown in the accompanying drawings, in which like reference numbers indicate corresponding parts throughout.

BRIEF DESCRIPTION OF THE DRAWINGS

FIG. 5 is an exploded view of the flow control unit showing it with a modified clip used with a slightly different door and dual-channel insert, and showing the parts as they would be positioned for installation;

FIG. 6 is an enlarged sectional view of one preferred form of gasket useful with the invention; and FIG. 7 and 8 are elevational views of modified forms of fastening clips of the invention.

DESCRIPTION OF THE PREFERRED EMBODIMENTS OF THE INVENTION

Figure 1:
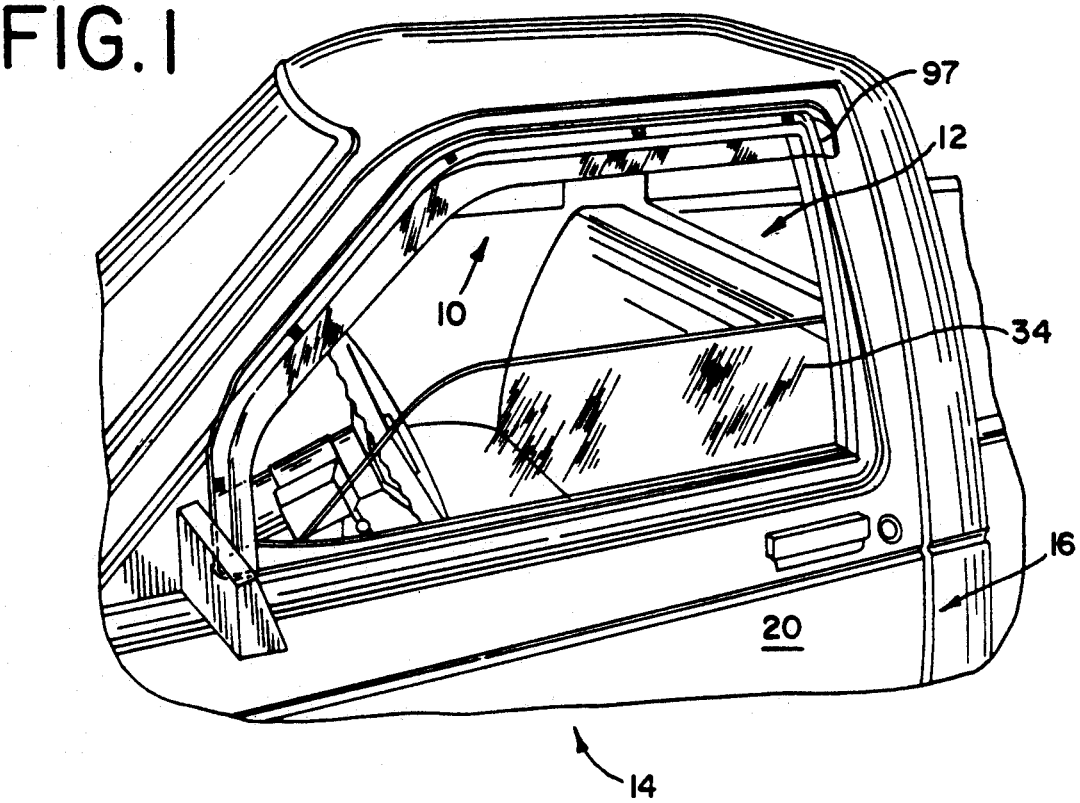
FIG. 1 is a perspective view of a vehicle having the air flow control device of the invention affixed thereto.

Referring now to the drawings in greater detail, certain preferred forms of the inventive air flow control device are illustrated. It will be understood that, according to the invention, the flow control device may be used with a variety of vehicles, but the inventive concept is primarily applicable to vehicles having the new style door and window frame arrangements that will be described in detail.

Figure 2:
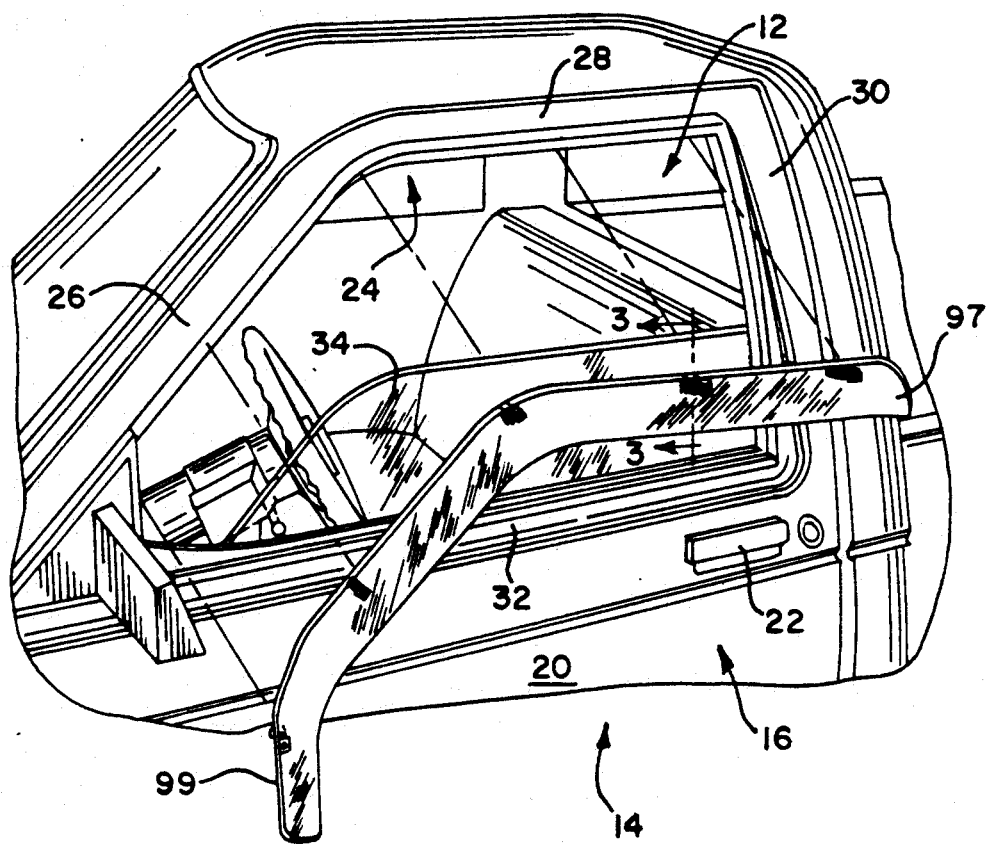
FIG. 2 is a perspective view similar to that of FIG. 1, but showing the air flow control device spaced apart from the vehicle as it would be prior to installation.

Referring now to FIGS. 1 and 2, an air flow control device generally designated 10 is shown to be associated with a window opening portion generally designated 12 of a automotive vehicle generally designated 14. In this case, the vehicle 14 is shown as being a light duty pickup truck having a door generally designated 16 with an outer surface which includes a main, outer door panel 20, a door handle 22, and an upper, window frame portion generally designated 24. The window opening 12 is defined by in part by a series of exterior surfaces, namely a front exterior surface 26, a top exterior surface 28, a rear exterior surface 30, and a lower or sill surface 32. A window light or panel 34 is positioned for vertical movement within the window opening 12.

Referring now in particular to FIG. 5, reference will be made to the construction of the vehicle door 14 in which the window opening 12 is provided. In keeping with recent practices, the vehicle door includes inner and outer door frame sections 34, 36 which are formed separately and then joined to each other along an outer seam generally designated 38 in FIG. 5 and an inner seam generally designated 40. The outer seam 38 is formed by overlaying, curling and spot welding inner and outer margins 42, 44 respectively of the door frame to each other to create the continuous outer seam 38 that defines the entire outer periphery of the door 16 (FIGS. 1 and 2). A portion of the vehicle top 45 includes cooperating surfaces and weatherstripping 47 needed to seal the vehicle top to the door.

The front, upper, and rear portions 26, 28, 30 of the window opening 12 (FIGS. 1 and 2) lie parallel to counterpart portions of the inner seam 40. This seam is also made from margins of the inner and outer panels of the door frame, in this case, by the margins 46, 48 of such panels 34, 36 respectively. According to current practice in the automotive industry, this inner seam 40 is an insertreceiving seam adapted to position a composite, dual-channel insert generally designated 50.

Figure 3:
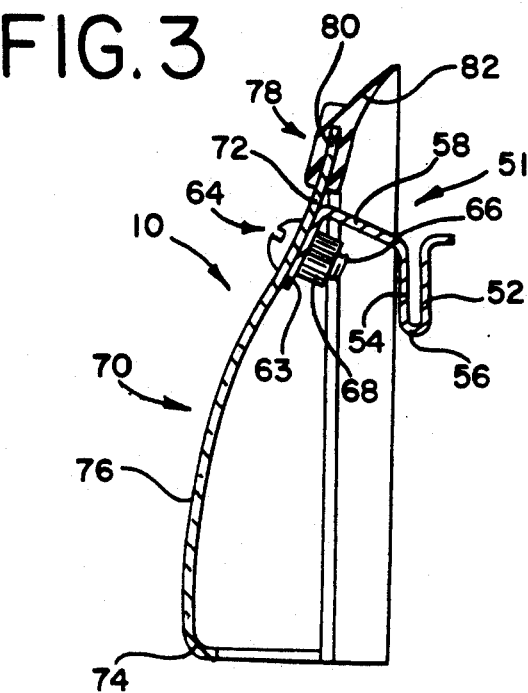
FIG. 3 is a vertical sectional view, taken along lines 3—3 of FIG. 2 on an enlarged scale and showing a cross-section of the deflector unit, including the fastening clip and the gasket arrangement, as well as certain contours of the deflector element.

Referring now to FIG. 3, a pre-assembled but not installed form of the device 10 is shown in vertical elevation, including parts of its mounting system. FIG.

3 shows that a resilient mounting clip generally designated 51 is constructed and arranged so as to include legs 52, 54 connected by a bight portion 56 that biases the legs inwardly toward each other in their relaxed position. An offsetting portion 58 of the mounting clip 5 is inclined to the horizontal so as to lie approximately parallel to the shoulder surface 60 (FIG. 5) defining an insert-receiving portion of a corner area 62, in a manner to be described. Referring again to the mounting clip 51, FIG. 3 also shows that an outer o mounting section thereof 63 is inclined outwardly and downwardly relative to the offsetting portion 58 and that fastening means generally designated 64 is provided and is shown to be in the form of a screw 66 having an associated nut 68 for securing the clip section 62 to the deflector unit.

Figure 4:
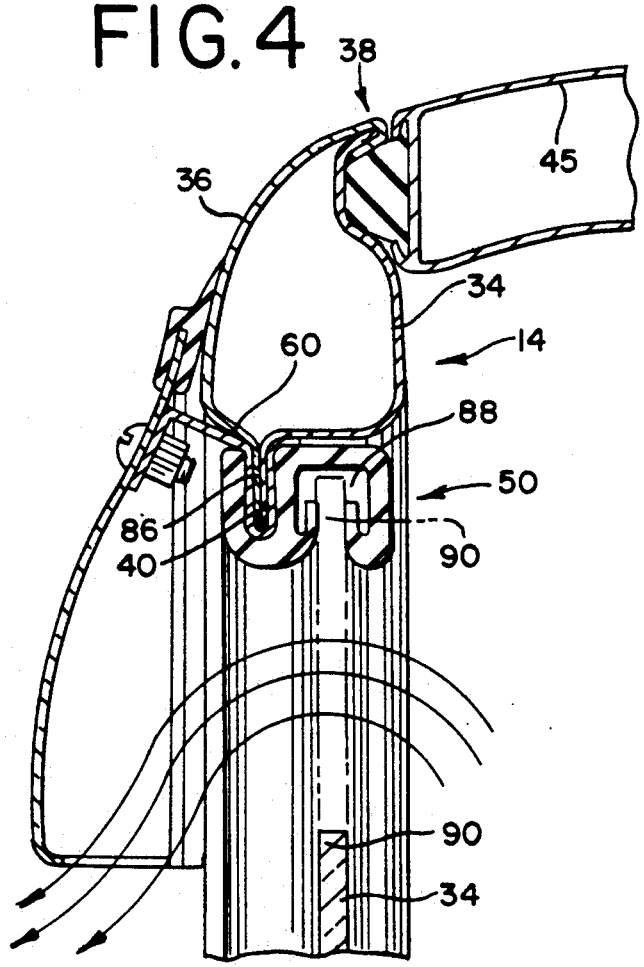
FIG. 4 is a vertical sectional view of the inventive flow control device of FIG. 3 in the installed position within the vehicle door frame and showing the clip of the invention attached to the seam which defines the window glass opening and along which the inner and outer door panels are fastened to each other.

Referring again to the flow control device 10, this unit also includes a deflector element portion generally designated 70 shown to include a contact margin 72, a free margin 74, and a contoured center body portion 76. The outer body portion 76 is bowed or contoured outwardly such that the free margin 74 extends slightly beyond the outer surfaces of an associated outer window frame section, such as the sections 26, 28 (FIG. 1) and well beyond, such as two to three more inches, the plane of the window panel 34 (FIG. 4). By "beyond" is meant toward the airstream or vehicle exterior.

Another element of the flow control device 10 is the gasket unit generally designated 78. As best shown in FIG. 6, the gasket 78 has a mounting groove portion 80 and an engagement lip 82 for contact with on of the window frame surfaces. The groove is defined by legs 91, 93, and the engagement lip 82 has a contact surface 95 and a feather edge 83.

In FIG. 5, the device 10 is shown before installation in position of use, with the dual channel insert generally designated 50 spaced from the inner seam 40 The insert 50 includes one channel 86 for snug engagement with the seam 40 and another channel 88 for engaging the upper margin 90 of the window panel 34.

Referring again to FIG. 5, a non-destructive method of installing the deflector 10 is shown. Here, the window frame seam 40 lies farther from the outer edge 36 than its counterpart in FIG. 4, and consequently, the insert 50 is of a "reversed out" configuration, i.e., the inner channel 86 is narrow and receives the seam 40 while the outer channel 88 is wider and receives the margin 90 of the window panel 34. Also, the outer channel 88 opens downwardly and the inner channel 86 opens upwardly.

Referring now to installation, when it is desired to install the deflector, the dual channel insert 50 is simply pulled away from the seam 40a and downwardly towards the window panel 34 so that it is completely separated from the seam 40 with which it is normally associated. Thereupon, the clips 51 ar snapped into place with their seam-engaging portions snugly embracing the seam 40.

Referring again to FIG. 1, the fasteners 64 are preferably spaced apart as shown, and lie along the top and front surfaces of the window frame. Three to five clips are usually employed. Once these clips are inserted, which takes only a matter of seconds, the clips are raised fully until the clip legs 52, 54 snugly engage the seam. Thereafter, the dual channel insert 50 is again pressed over the seam 40, where it covers both the seam 40 and the inner parts 52, 54, 56, 58 of the clips as well.

Because the clips are made from a thin, spring steel stock, the space they occupy is negligible, especially in view of the resilient character of the composite dual channel insert. Having reinstalled the dual channel insert over the clips, the flow control unit is then doubly secured in position and the unit is ready for use. The particular angle of inclination between the clip offsetting leg 88 and the seam-receiving portions of the clip 51 is selected so that there is sufficient force from the clip to urge the contact margin 72 of the deflector element into snug engagement with the outer door frame surface 36. In those preferred constructions wherein a gasket 78 is provided, the gasket 78 serves as the contact between the window frame and the deflector and reliably and ensures that there is no air leakage and in particular, no water leakage between them.

In this sense, the expression "contact margin" as used herein and in the claims, is intended to refer to this portion of the deflector element per se if it is used without a gasket, and to include both the margin and the gasket if the gasket is provided.

Referring again to FIG. 6 in the embodiment shown, the gasket uses its own resiliency to provide a snug, noise-free, water-tight seal. However, it is within the scope of the invention, although not presently preferred, to cover the inner surface 95 of the gasket with an adhesive or the like if this is believed desirable for any reason.

Referring now to FIGS. 7 and 8, other clips 51b, 51c are shown. The clips of FIGS. 7 and 8 are identical to their counterparts shown in FIGS. 3, 4 and 5, except that an extremely short, offsetting leg 58b is shown in FIG. 7 and in FIG. 8, the offsetting leg 58b is shown as being much longer. Both the length of these legs and the degree of inclination relative to the flanges 62b, 62c and the inner pairs of legs 52b, 54b, 52c, 54c are arranged so as to cooperate with a vehicle door structure.

Referring now to the preferred contours of the deflector unit, FIG. 1 shows a preferred form having a lower, vertically extending section, a rearwardly and upwardly extending intermediate portion and a horizontal top portion terminating with the free margin extending horizontally and joining the vertical surface at a curved in area. The gasket preferably extends to this junction, which is generally designated 97 in FIGS. 1 and 2. The fasteners shown are simple slotted screws, but rivets or other suitable expedients may be used.

The deflector itself is preferably made from a thermoplastic sheet material which, by reason of its contour, is relatively stiff in bending. In one preferred form, a transparent material is provided, which may be tinted or shaded for sun protection. The material may be impact-resistant material, such as a polycarbonate plastic or may be another plastic material such as an acrylate polymer. Other readily shapeable materials may be used, and an opaque deflector unit may be provided; a vinyl material is suitable for making such opaque deflectors.

Generally, where the window in question is relatively high, and visibility is not critical, an opaque design may be more desirable for excluding light; other opaque designs may be readily color matched if this is desirable. While the clips form the basic means of attaching the deflector unit to the window frame, it is possible for one or more of the portions, such as the lower leading edge 99 (FIG. 2) of the deflector, to be secured to a part of the vehicle by an adhesive tape material. This may be preferable if there is no weatherstripping or other insert there to permit clip mounting.

In addition to the plastic materials referred to above, it has been found that one preferred material combines low-cost ready formability and other advantages. This is a so-called high impact acrylic material believed to contain about 60% butadiene or butadiene-based polymer and 40% of an acrylic polymer. Such a material is readily die cuttable and is moderately to highly impact-resistant. Unmodified acrylics, clear vinyls and high impact styrene materials may also be suitable for practicing the invention, and consequently, the exact material used is not of crucial importance to the practice of the invention.

Referring to the method of forming the products, different methods may be suitable, depending upon the material used, its thickness, and the final contours of the desired design. In some instances, the exterior contours of the product may be die cut and the product made by drape-forming, i.e., securing one margin of the blank to the edge of the forming die, heat-softening the remainder of the blank and permitting it to drape by heat into the female die or mold and thus achieve a desired contour. It is also possible to add to this method an additional step of pressing a male mold over the part as it is formed in the female mold.

It is also possible to make the deflector element by vacuum forming, which is a well-known method that involves drawing a vacuum in one mold section so as to draw a heat softened plastic sheet down and over the contours of the mold. These and similar methods involve heat, with or without vacuum, and some such known methods are simply referred to as thermoforming. It is also sometimes attractive, from a manufacturing standpoint, to form the outer edges of the product by cutting with a numerically controlled router; the inner edges may be cut similarly, die cut, or formed in another way. Those skilled in the art of manufacturing sheet plastic materials are acquainted with these and other preferred forming methods.

The dual-channel insert exists in numerous forms and is now an accepted expedient in the auto industry. Many dual-channel inserts are made from two, three or four materials, either coextruded in part or manufactured separately and thereafter laminated. Typical inserts include soft, rubber-like areas for engagement with a window margin and relatively hard, rigid but springy areas for engaging the seam. Some of the spring forces needed may be supplemented by metal inserts or such inserts may be preformed and have rubber, plastic or both coextruded around them or bonded thereto. Inasmuch as such inserts are a multi-function product, they are made by auto manufacturers to serve the numerous requirements. Such inserts are not a necessary part of the invention, although their use, combined with the seams formed in making window frames, serves as an attachment point for mounting the inventive deflectors.

In this connection, it is believed that, since the advent of newer style door seams, there has not been a non-adhesive, non-destructive method of installing air flow control devices, nor have there been flow control devices taking advantage of the new door structures. It is a feature of the present invention that it can successfully fulfill this requirement. Different embodiments of the present invention having been illustrated by way of example, it is understood that it will occur to those skilled in the art that variations and modifications may be made to the described forms of air flow control devices and it is anticipated that such modifications and changes may be made without departing from the spirit of the invention or the scope of the appended claims.

I claim:

1. An air flow control device for attachment to the window frame portion of a vehicle door, said door including inner and outer window frame sections joined to each other along a continuous outer seam defining the profile of the door as a whole, and an insert-receiving inner seam defining the front, upper and rear portions of said window frame portion, said outer window frame section including an outer surface and a shoulder surface extending inwardly of said outer surface toward said inner seam, a composite, dual-channel insert removably received in snug-fitting relation over, and being carried by, said inner seam, one of said dual channels having an inwardly directed weatherstrip section for receiving the outer margins of a movable glass window received in said door and movable between open and closed positions, and the other of said channels being dimensioned so as to grip said inner seam for positioning said weatherstrip channel, said air flow control device comprising, in combination, a flow deflector element, plural, resilient mounting clips, and plural clip fasteners, said flow deflector element including an outer, contact margin for engagement with a portion of said outer surface of said window frame section, a free margin spaced from and lying generally parallel to said contact margin, and a contoured center body portion lying between said contact margin and said free margin and formed so that said free margin lies outwardly of the surfaces of said glass window and said frame outer surface, and with each of said mounting clips including a seam-engaging portion, an offsetting flange and a deflector element attaching section secured to said central body portion by said plural clip fasteners, with said offsetting flanges of said clips lying generally parallel to said shoulder surface, being free of contact with said outer window frame surface, and being spaced from portions of said shoulder surface so as to urge said deflector element contact margin into snug engagement with said outer surface of said window frame portion, said seam-engaging portion of said clip being positioned in use between said insert-receiving seam and said dual-channel insert.

2. An air flow control device as defined in claim 1 wherein said seam-engaging portion of each of said mounting clips is defined by inner and outer, closely spaced apart clip legs joined to each other by a bight portion and resiliently biasing said legs towards each other.

3. An air flow control device as defined in claim 1 which further includes a gasket unit secured to and overlying at least a portion of said contact margin of said flow deflector element.

4. An air flow control device as defined in claim 1 wherein said contact margin also includes a rear margin portion extending substantially vertically and in use contacting an upper section of said rear portion of said window frame, said free margin having one of its ends joined to the lowermost portion of said downwardly extending contact margin.

5. An air flow control device as defined in claim 1 wherein said dual channel insert includes an inner channel for engagement with said seam portion of said window frame and an outer channel adapted to receive a window panel.

6. An air flow control device as defined in claim 1 wherein said dual channel insert includes an outer channel for engagement with said seam portion of said window frame and an inner channel adapted to receive a window panel.

7. An air flow control device as defined in claim 1 wherein said flow deflector element is made from a transparent thermoplastic material.

8. An air flow control device as defined in claim 1 wherein said flow deflector element is made from an opaque thermoplastic material.

9. An air flow control device for attachment to the window frame portion of a vehicle door, said door including inner and outer window frame sections joined to each other along a continuous outer seam defining the profile of the door as a whole, and an insert-receiving inner seam defining the front, upper and rear portions of said window frame portion, said outer window frame section including an outer surface and a shoulder surface extending inwardly of said outer surface toward said inner seam, a composite, dual-channel insert removably received in snug-fitting relation over, and being carried by, said inner seam, one of said dual channels having an inwardly directed weatherstrip section for receiving the outer margins of a movable glass window received in said door and movable between open and closed positions, and the other of said channels being dimensioned so as to grip said inner seam for positioning said weatherstrip channel, said air flow control device comprising, in combination, a flow deflector element, plural, resilient mounting clips, and plural clip fasteners, said flow deflector element including an outer margin for engagement with a portion of said outer surface of said window frame section, a gasket unit secured to and overlying at least a portion of said outer margin, a free margin spaced from and lying generally parallel to said outer margin, and a contoured center body portion lying between said outer margin and said free margin and formed so that said free margin lies outwardly of the surface of said glass window and said frame outer surface, and with each of said mounting clips including a seam-engaging portion defined by inner and outer, closely spaced apart clip legs joined to each other by a bight portion and resiliently biasing said legs towards each other, an offsetting flange and a deflector element attaching section secured to said center body portion by said plural clip fasteners, with said offsetting flanges of said clips lying generally parallel to said shoulder surface, being free of contact with said outer window frame surface, and being spaced from portions of said shoulder surface so as to urge said gasket and said outer margin of said deflector element into snug engagement with said outer surface of said window frame portion, said seam-engaging portion of said clip being positioned in use between said insertreceiving seam and said dual-channel insert.

10. An air flow control device as defined in claim 9 wherein said gasket includes a feather edge outer section and a body portion having a groove for engagement with said outer margin of said air flow control device.

11. A non-adhesive, non-destructive method of securing an air flow control device to the window frame portion of a vehicle door, wherein said door includes inner and outer window frame sections joined to each other along a continuous outer seam defining the profile of the door as a whole, an insert-receiving inner seam defining the front, upper and rear portions of said window frame portion, said outer window frame section including an outer surface and a shoulder surface extending inwardly of said outer surface toward said inner seam, and wherein said door also includes a composite, dual-channel insert including a seam-receiving portion and being removably carried by said inner seam, and wherein said air flow control device includes a flow deflector element with an outer contact margin for engagement with a portion of the outer surface of said window frame section lying adjacent said inner seam, and plural, resilient mounting clips fastened to said deflector with each of said mounting clips including a seam-engaging portion, an offsetting flange and a deflector element attaching section secured to said center body portion by said plural clip fasteners, said method comprising temporarily removing said dual-channel insert from said inner seam, positioning said air flow control device such that said seam-engaging portions of said clips engage said seam, said offsetting flanges of said clips lie adjacent to, spaced from portions of, and generally parallel to said shoulder surface and are out of contact with any portion of said window frame section outer surface, and repositioning said dual channel insert in snug relation to said seam such that the seamreceiving portion of said insert covers said seam-engaging portions of said clips and with said clip biasing said contact margin inwardly toward said outer surface of said outer window frame section, thereby securely but non-destructively mounting said air flow control device relative to said window frame.

* * * * *